United States Patent [19]
Nanba et al.

[11] Patent Number: 5,934,249
[45] Date of Patent: Aug. 10, 1999

[54] ENGINE CONTROL SYSTEM AND THE METHOD THEREOF

[75] Inventors: Atsushi Nanba; Akira Akimoto; Nobuhiro Hakura; Takashi Matsuura, all of Tokyo, Japan

[73] Assignee: Fuji Jukogyo Kabushiki Kaisha, Tokyo, Japan

[21] Appl. No.: 08/922,570

[22] Filed: Sep. 3, 1997

[30] Foreign Application Priority Data

Sep. 25, 1996 [JP] Japan ......................................... 253563

[51] Int. Cl.$^6$ ..................................................... F02D 43/00
[52] U.S. Cl. .................... 123/350; 123/478; 123/568.21; 701/108
[58] Field of Search .......................... 123/568.19, 568.21, 123/480, 672, 674, 494, 350, 698, 478, 486; 701/104, 105, 108

[56] References Cited

U.S. PATENT DOCUMENTS

| | | | |
|---|---|---|---|
| 4,454,855 | 6/1984 | Otobe et al. | 701/108 |
| 4,836,174 | 6/1989 | Chujo et al. | 123/568.21 |
| 5,205,260 | 4/1993 | Takahashi et al. | 123/494 |
| 5,273,019 | 12/1993 | Matthews et al. | 123/568.21 |
| 5,383,126 | 1/1995 | Ogawa et al. | 701/104 |
| 5,566,071 | 10/1996 | Akazaki et al. | 123/672 |
| 5,682,864 | 11/1997 | Shirakawa | 123/568.21 |

*Primary Examiner*—Andrew M. Dollnar
*Assistant Examiner*—Arnold Castro
*Attorney, Agent, or Firm*—Smith, Gambrell & Russell, LLP; Beveridge, DeGrandi, Weilacher & Young Intellectual Property Group

[57] ABSTRACT

The EGR gas flow is established based on the difference between an assumed value and a control target value of non-air components partial pressure calculated from target control values such as engine torque and at the same time the intake air flow passing through a throttle valve is established based on the difference between an assumed value and a control target value of air components partial pressure and based on the air components within EGR gas. Further, based on thus established EGR gas flow and the intake manifold pressure, the operating amount of an EGR actuator is calculated and based on thus established air flow passing through the throttle valve, the operating amount of an throttle actuator is obtained. Further, based on an estimated value of air components partial pressure, a final basic fuel injection amount is determined. An object of the present invention is to provide an engine control system and method capable of improving a drive feel and emissions simultaneously by integrally controlling fuel injection, induction air and EGR.

17 Claims, 12 Drawing Sheets

ENGINE CONTROL SYSTEM AND THE METHOD THEREOF

BACKGROUND OF THE INVENTION

1. Field of the Invention

The present invention relates to an engine control system and method and particularly to an engine control system and method in which fuel injection, air induction and exhaust gas recirculation are integrally controlled corresponding to an operator's accelerator operation.

2. Prior Arts

Modern automobile internal combustion engines are required to meet various requirements such as emissions, fuel economy, driveability, performance and the like. One solution to satisfy these requirements is a stratified charge combustion engine. In conventional engines, since fuel injection quantity is determined from the amount of air passing through the throttle valve, the air-fuel ratio can not be changed largely. On the other hand, the stratified charge engine is required to be operated within a wide range of air-fuel ratio. When the air-fuel ratio changes abruptly, the change of torque would exceed an allowable limit of driveability unless the amount of injected fuel is determined in accordance with changing torque.

Recently, several techniques have been proposed in which the required amount of fuel and air is determined on the basis of engine torque. For example, Japanese Patent Application Laid-open No. Toku-Kai-Hei 1-313636 discloses a technique wherein first, a target engine torque is determined based on the accelerator depressing amount and the engine speed, then the fuel injection amount is controlled according to this target engine torque and at the same time the intake air amount is controlled by electronically adjusting the opening angle of the throttle valve through an actuator.

In transient operating conditions of the engine, however, it is difficult to supply a proper amount of air, because there is a deviation due to a time lag needed for charging air in the intake manifold and the collector chamber having a certain volume or due to a time lag of operation in actuating devices, between the required air amount corresponding to the target torque and the actual air amount sucked into the cylinder. Due to this, there is a difficulty in supplying appropriate amounts of air and fuel.

To solve the problem, Japanese Patent Application Laid-open No. Toku-Kai-Hei 3-185248 discloses a technique in which compensation is made to a phase lag corresponding to time lag of intake air and actuating devises with respect to the target torque or the fuel injection amount itself so as to prevent an excessive or short fuel supply to cylinders.

However, since the aforementioned throttle valve control according to the prior arts are performed based on an open-loop control strategy but not a feedback control strategy, air flow deviations or air flow changes produced from variations between throttle valves, changes of the opening area of the throttle valve due to temperature change or stains on throttle valves can not be deleted.

Further, in case of an engine employing an EGR valve for reducing emissions, there is a delay of response of the EGR valve caused by a time lag needed for charging the EGR gas into the collector chamber and a time lag of operation of the EGR valve itself. It can be considered that this delay of response can be compensated by fuel injection timing or ignition timing, however it is difficult to determine under the transient condition the fuel injection timing and the ignition timing and further the target air-fuel ratio and the EGR ratio because of the difference between the response characteristic of the throttle valve and that of the EGR valve.

SUMMARY OF THE INVENTION

The present invention has been accomplished, taking these problems of the prior arts into consideration and it is an object of the present invention to provide an engine control system and method capable of improving emissions, fuel economy and driveability through optimizations of the fuel injection amount, the intake air amount and the EGR amount.

To achieve the object, the control system comprises:

engine speed calculating means for calculating an engine speed;

accelerator angle calculating means for calculating an accelerator opening angle;

control parameter establishing means for establishing target values of control parameters based on the engine speed and the accelerator opening angle;

initial set value establishing means for establishing initial set values of a basic fuel injection amount, an EGR rate and an in-cylinder equivalent ratio, respectively, based on the target values;

equivalent ratio assuming means for assuming an EGR gas equivalent ratio from the initial set value of the in-cylinder equivalent ratio;

control target value establishing means for establishing a first control target value with respect to an air components partial pressure of intake manifold pressure and a second control target value with respect to non-air components partial pressure of intake manifold pressure, respectively, based on the initial set value of the in-cylinder equivalent ratio initial set value, said basic fuel injection amount and the initial set value of the EGR rate;

non-air components partial pressure assuming means for assuming the non-air components partial pressure based on an air flow passing through the throttle valve and air components and non-air components of EGR gas;

EGR gas flow establishing means for establishing an EGR gas flow based on a difference between thus assumed non-air components partial pressure and the second control target value of the non-air components partial pressure;

air components partial pressure assuming means for assuming the air components partial pressure based on the air flow passing through the throttle valve and air components of EGR gas and non-air components thereof;

air flow establishing means for establishing an air flow passing through the throttle valve based on a difference between thus assumed air components partial pressure and the first control target value of the air components partial pressure and on the air components of EGR gas;

an EGR actuator for actuating the EGR valve so as to control the EGR gas;

EGR actuator means for calculating an operating amount of the EGR actuator based on the established value of the EGR gas flow and the intake manifold pressure and for actuating the EGR valve according to the operating amount of the EGR actuator;

a throttle actuator for actuating the throttle valve so as to control the intake air;

throttle actuator means for calculating an operating amount of the throttle actuator based on the established value of the air flow passing through the throttle valve and the intake manifold pressure and for actuating the throttle valve according to the operating amount of the throttle actuator; and fuel injection amount establishing means for calculating an operating amount of the fuel injector and establishing the final basic fuel injection amount.

DETAILED DESCRIPTION OF THE INVENTION

Figure 2:
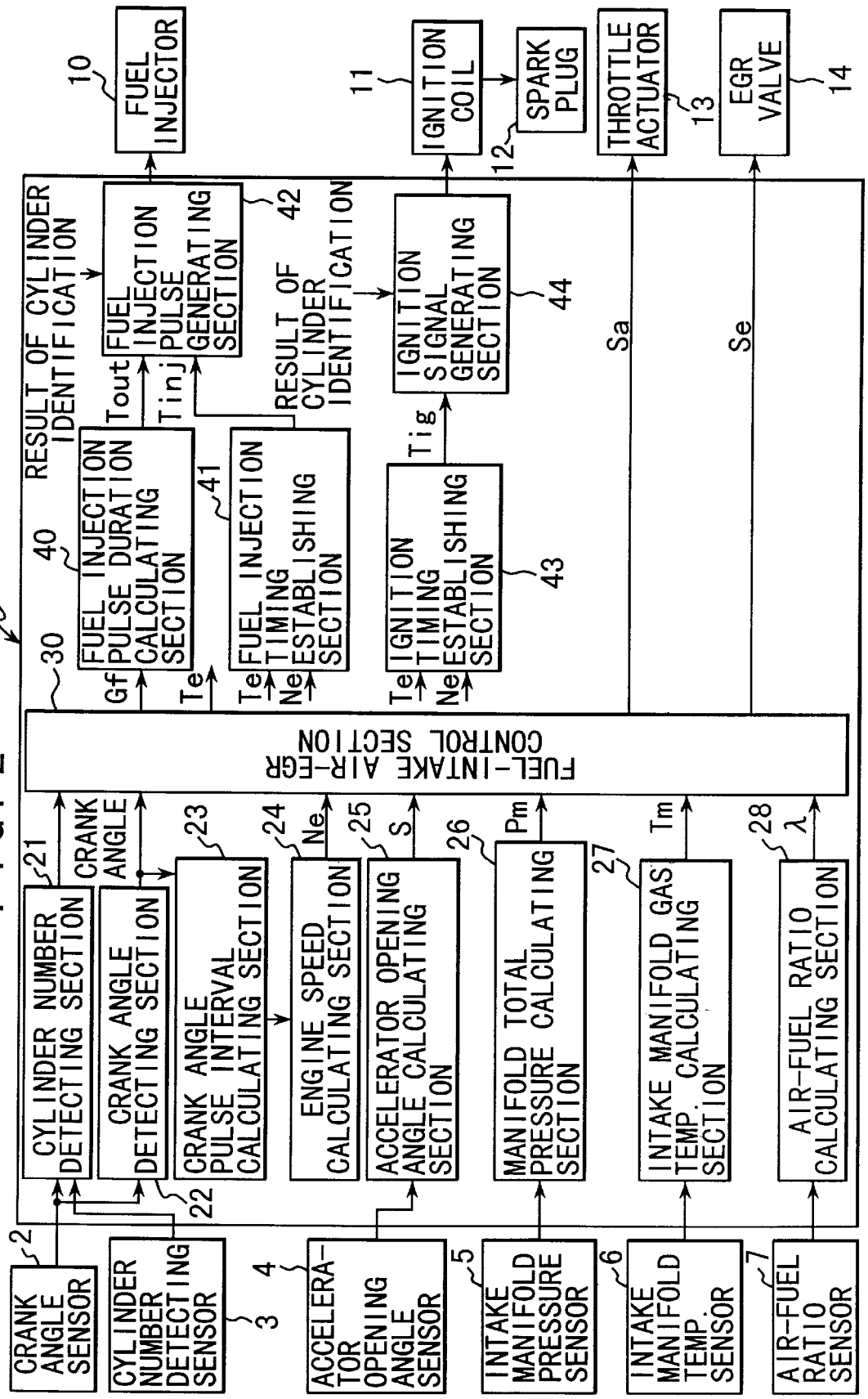
FIG. 2 is an overall block diagram of the engine control system according to the first embodiment.

Referring now to FIG. 2, numeral 20 denotes a main portion of a control unit to which various sensors for detecting engine operating conditions and actuators for controlling the engine are connected respectively.

These sensors include a crank angle sensor 2 from which a pulse signal is outputted every specified crank angle, a cylinder number detecting sensor 3 from which a pulse signal is outputted for identifying respective cylinders, an accelerator opening angle sensor 4 from which a voltage signal is outputted according to a degree of depression of an accelerator pedal (not shown), an intake manifold pressure sensor 5 from which a voltage signal is outputted according to pressure in the intake manifold, an intake manifold temperature sensor 6 from which a voltage signal is outputted according to gas temperature within the intake manifold and an air-fuel ratio sensor 7 for detecting an air-fuel ratio.

Further, these actuators include a fuel injector 10 for injecting fuel, an ignition coil 11 which is connected with a spark plug 12, a throttle actuator 13 for varying a throttle angle and an EGR valve 14 for controlling the EGR amount.

Further, the control unit 20 having functions to calculate various control parameters based on signals from sensors, comprises a cylinder number detecting section 21, a crank angle detecting section 22, a crank angle pulse interval calculating section 23, an engine speed calculating section 24, an accelerator opening angle calculating section 25, a manifold total pressure calculating section 26, an intake manifold gas temperature calculating section 27, an air-fuel ratio calculating section 28, a fuel-intake air-EGR control section 30 which acts as a center controller of the present invention, a fuel injection pulse duration calculating section 40, a fuel injection timing establishing section 41, a fuel injection pulse generating section 42, an ignition timing establishing section 43 and an ignition signal generating section 44.

In the cylinder number detecting section 21, a specific number of cylinder is identified according to an input pattern of an output pulse signal (crank pulse) from the crank angle sensor 2 and an output pulse signal (cylinder identifying pulse) from the cylinder number detecting sensor 3. Further, in the crank angle detecting section 22, a specified crank angular position of the identified particular cylinder is established to be a reference crank angular position and then crank angular positions corresponding subsequent crank pulses following the reference crank angular position are detected. Further, in the crank angle pulse generating interval calculating section 23, a time interval of inputted crank pulses is timed and an elapsed time between crank angles is calculated. In the engine speed calculating section 24, an engine revolution speed Ne (engine speed) is calculated from an elapsed time while the crank shaft rotates 180°.

In the accelerator opening angle calculating section 25, an accelerator opening angle (amount of an accelerator depression) S is calculated based on the output voltage of the accelerator opening angle sensor 4. Further, in the manifold total pressure calculating section 26, a manifold pressure, (i.e., a sum of the partial pressure of air components and the partial pressure of non-air components and hereinafter, referred to as a manifold total pressure) Pm is calculated based on the output voltage of the intake manifold pressure sensor 5. Further, in the intake manifold gas temperature calculating section 27, a gas temperature Tm in the intake manifold is calculated based on the output voltage of the intake manifold temperature sensor 6, and in the air-fuel ratio calculating section 28 an air-fuel ratio $\lambda$ is calculated based on the output voltage of the air-fuel ratio sensor 7.

Figure 1:
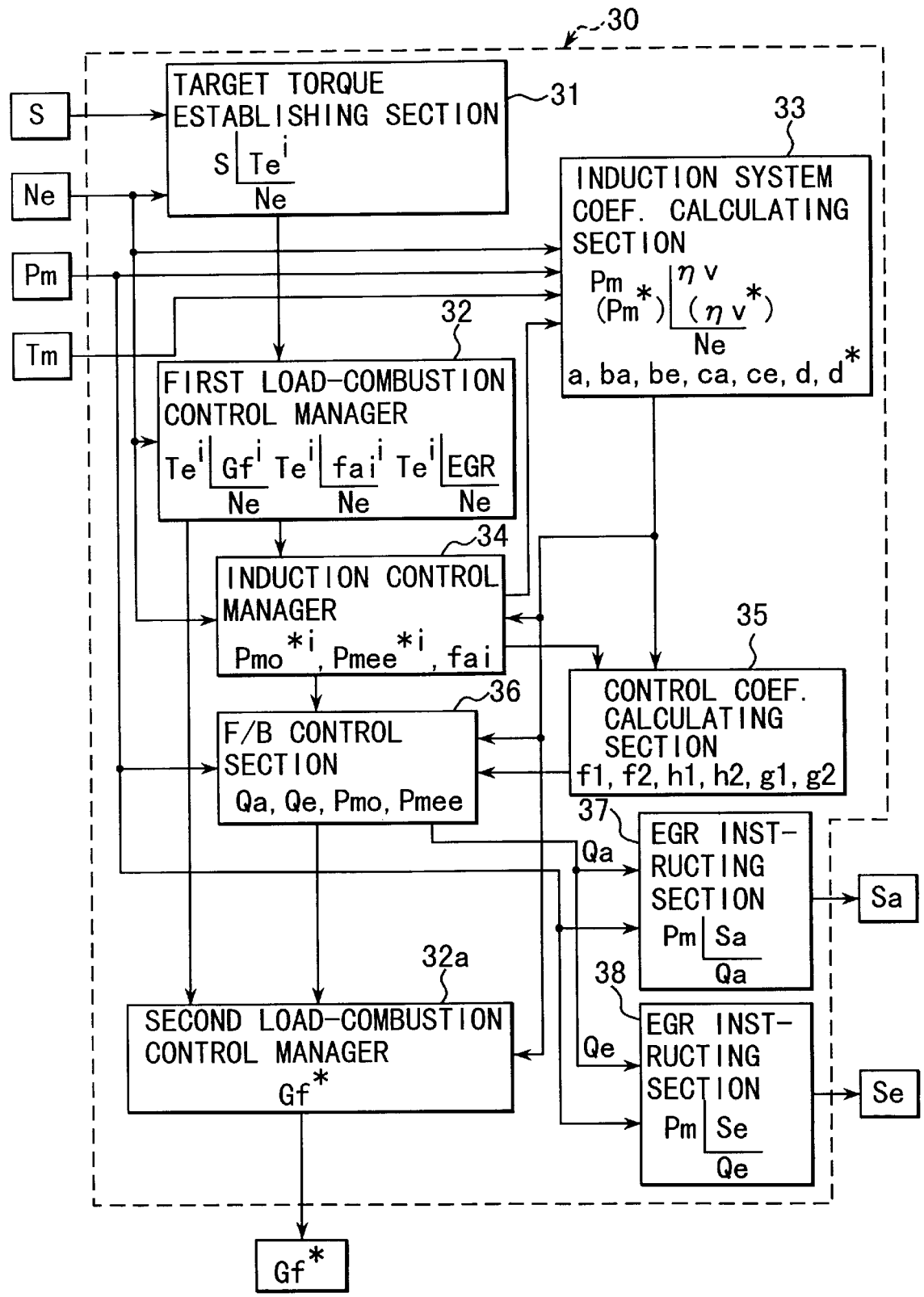
FIG. 1 is a block diagram of the fuel control, intake air control and EGR control according to a first embodiment of the present invention.

The fuel-intake air-EGR control section 30 comprises, as shown in FIG. 1, a target torque establishing section 31, a first load-combustion control manager 32, a second load-combustion control manager 32a, an induction system coefficient calculating section 33, an induction control manager 34, a control coefficient calculating section 35, a feed-back (F/B) control section 36, an electronically controlled throttle (ETC) instructing section 37 and an EGR instructing section 38.

In the target torque establishing section 31, a target engine torque $Te^i$ is established based on the engine speed Ne and the accelerator opening angle S. Further, in the first load-combustion control manager 32, a basic fuel injection amount and an EGR set value (EGR rate) corresponding to the target engine torque $Te^i$ is established as a respective initial value, and in the induction control manager 34, a partial pressure of the air components and a partial pressure of the non-air components are established respectively from the basic fuel injection amount and the EGR set value. In the F/B control section 36, a throttle actuator instructing value as an operating amount of the throttle actuator 13 and an EGR valve instructing value as an operating amount of the EGR valve 14 are calculated according to an induction system model which will be described hereinafter. Further, in the second load-combustion control manager 32a, a final basic fuel injection amount for calculating an operating amount of the fuel injector 10 is calculated.

Figure 7:
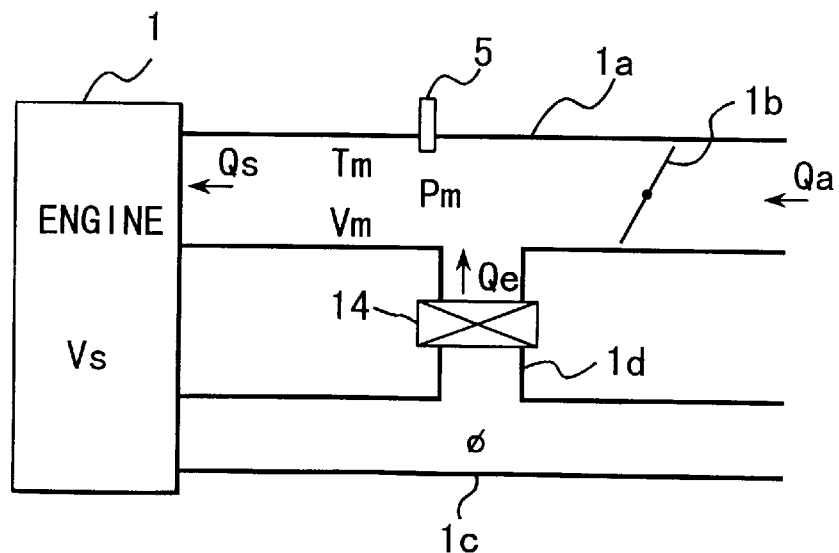
FIG. 7 is a diagram showing an explanatory model of the intake air system.

Describing the induction system model shown in FIG. 7, the model is constituted by an engine 1, an intake pipe 1a, a throttle valve 1b provided in the intake pipe 1a, an exhaust pipe 1c, an exhaust gas recirculation (EGR) pipe 1d for connecting the intake pipe 1a with the exhaust pipe 1c and an EGR valve 14. In thus constituted induction system model, the amount of the air filled up in the intake pipe is expressed by a sum of the air flow Qa passing through the throttle and the EGR gas flow Qe supplied into the intake pipe 1a through the EGR valve.

The amount of the air within the intake pipe is obtained by deleting the air components flow Qso flowing into the cylinder from the sum of the air flow Qa passing through the throttle valve 1b and the air components flow Qea passing through the EGR valve 14. A variation versus time of the air components flow within the intake pipe, dPmo/dt can be expressed as follows, when an equation of state of gas is applied:

$$dPmo/dt = (Qa + Qea - Qso) \cdot Ra \cdot Tm/Vm \quad (1)$$

where Vm is a volume of the intake pipe, Tm is a gas temperature in the intake pipe and Ra is a gas constant of the air components.

Further, since the amount of the non-air (non-air components in EGR gas) is obtained by deleting the non-air components flowing into the cylinder from the non-air components in EGR gas passing through the EGR valve 14, a variation versus time of the partial pressure Pmee of the non-air components in the intake pipe, dPmee/dt can be expressed similarly as follows:

$$dPmee/dt = (Qee - Qsee) \cdot Re \cdot Tm/Vm \quad (2)$$

where Qee is a non-air components flow in EGR gas passing through the EGR valve, Qsee is a non-air components flow in EGR gas flowing into the cylinder and Re is a gas constant of the non-air components.

Further, the air components flow Qea in EGR gas passing through the EGR valve and the non-air components flow Qee in EGR gas flowing through the EGR valve are expressed in the following equations (3) and (4):

$$Qea = (1 - \Phi) \cdot Qe \quad (3)$$

$$Qee = \Phi \cdot Qe \quad (4)$$

where $\Phi$ is an equivalent ratio and Qe is an EGR gas flow passing through the EGR valve.

The air components flow Qso flowing into the cylinder and the non-air components flow Qsee flowing into the cylinder are rewritten in the following equations (5) and (6).

$$Qso = ((Pmo \cdot Vs)/(Ra \cdot Tm)) \cdot \eta_v \cdot (Ne \cdot L/120) \quad (5)$$

$$Qsee = ((Pmee \cdot Vs)/(Re \cdot Tm)) \eta_v \cdot (Ne \cdot L/120) \quad (6)$$

where Vs is a volume of one stroke per one cylinder, $\eta_v$ is a volumetric efficiency and L is the number of cylinders.

Accordingly, when the equations (1) and (2) are expressed in the form of matrix, substituting the equations (3) through (6) into the equations (1) and (2), the state in the intake pipe can be expressed, as shown in an equation (10), by the variation versus time of the partial pressure Pmo of the air components and the variation versus time of the partial pressure Pmee of the non-air components, using the air flow Qa passing through the throttle valve, the EGR gas flow Qe passing through the EGR valve and the equivalent rate $\Phi$.

$$a = (Vs/Vm) \cdot \eta_v \cdot (Ne \cdot L/120) \quad (7)$$

$$b_a = Ra \cdot Tm/Vm \quad (8)$$

$$b_e = Re \cdot Tm/Vm \quad (9)$$

$$\frac{d}{dt}\begin{bmatrix} Pmo \\ Pmee \end{bmatrix} = \begin{bmatrix} -a & 0 \\ 0 & a \end{bmatrix}\begin{bmatrix} Pmo \\ Pmee \end{bmatrix} + \begin{bmatrix} b_a & (1-\Phi) \cdot b_a \\ 0 & \Phi \cdot b_e \end{bmatrix}\begin{bmatrix} Q_a \\ Q_e \end{bmatrix} \quad (10)$$

Since, the air flow Qa passing through the throttle valve and the EGR gas flow Qe passing through the EGR valve can be calculated by employing the aforementioned induction model based on the partial pressure Pmo of air components in the intake pipe and the partial pressure Pmee of non-air components in the intake pipe, respectively, in the F/B control section 36 the gas flow Qe passing through the EGR valve is established by feeding-back the deviation between the target value of the partial pressure of the non-air components in the intake pipe and the assumed (calculated) value of the partial pressure of the non-air components in the intake pipe. Similarly, the air flow Qa passing through the throttle valve is established by feeding-back the deviation between the target value of the partial pressure of the air components in the intake pipe and the assumed (calculated) value of the partial pressure of the air components in the intake pipe.

Further, in the second load-combustion manager 32a, the final basic fuel injection amount is established and is outputted to the fuel injection pulse duration calculating section 40. Further, in the ETC instructing section 37, a throttle actuator instructing value Sa is established based on the manifold total pressure Pm and is outputted to the throttle actuator 13. Further, in the EGR instructing section 38, an EGR valve instructing value Se is established based on the manifold total pressure Pm and the EGR gas flow establishing value Qe passing through the EGR valve and outputted to the EGR valve 14. Furthermore, in the induction system coefficient calculating section 33 and the control coefficient calculating section 35, an induction system model coefficient and a feed-back control coefficient are calculated, respectively.

In the fuel injection pulse duration calculating section 40, a fuel injection pulse duration Tout as an operating amount of the fuel injector 10 is calculated based on the basic fuel injection amount Gf* which has been established in the fue-air-EGR control section 30. Further, in the fuel injection pulse generating section 42 a fuel injection pulse generating timer is set at a predetermined particular crank angle according to this fuel injection pulse duration Tout and a fuel injection timing Tinj which has been established in the fuel injection timing establishing section 41 and a fuel injection pulse is outputted therefrom to the fuel injector 10 according to that timing.

Further, in the ignition timing establishing section 43, an ignition timing Tig is established based on the engine speed Ne and the target engine torque $Te^i$. Further, in the ignition signal generating section 44 an ignition pulse generating timer is set at a predetermined particular crank angle according to this ignition timing Tig and an ignition signal is outputted to the ignition coil 11 at that timing to discharge the spark plug 12.

Next, the processes of the fuel-intake air-EGR control carried out in the main control unit 20 will be described with reference to the flowcharts shown in FIG. 3 through 6.

Figure 3:
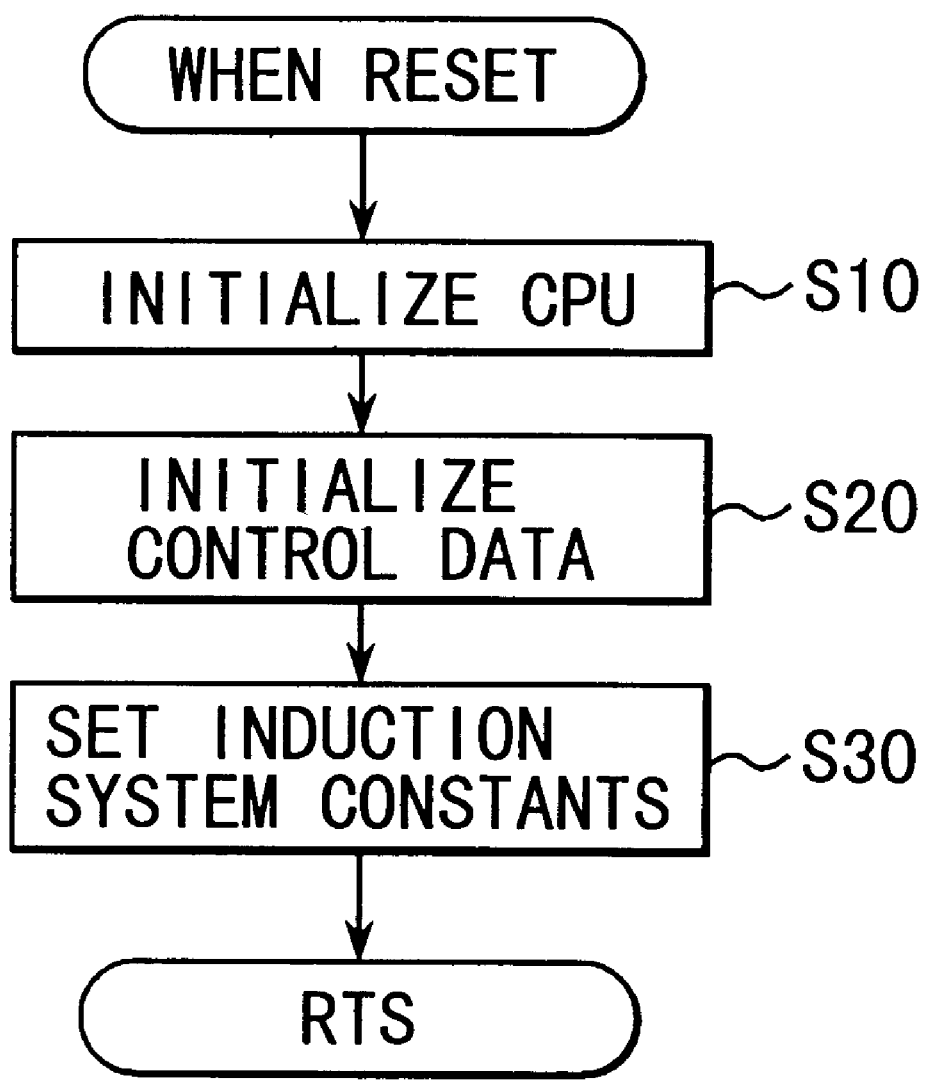
FIG. 3 is a flowchart illustrating an initialization routine.

A flowchart shown in FIG. 3 is an initialization routine which is executed, when an ignition switch (not shown) is turned on and the system is reset. First, at a step S10 (hereinafter simply referred to as S something) the CPU is initialized and at S20 control data are initialized. Further, at S30 various constants such as a volume Vm of the intake pipe, a cylinder volume Vs per stroke, the number L of cylinders, a gas constant Ra of air components and a gas constant Re of non-air components, are set and the program leaves the routine.

Figure 4:
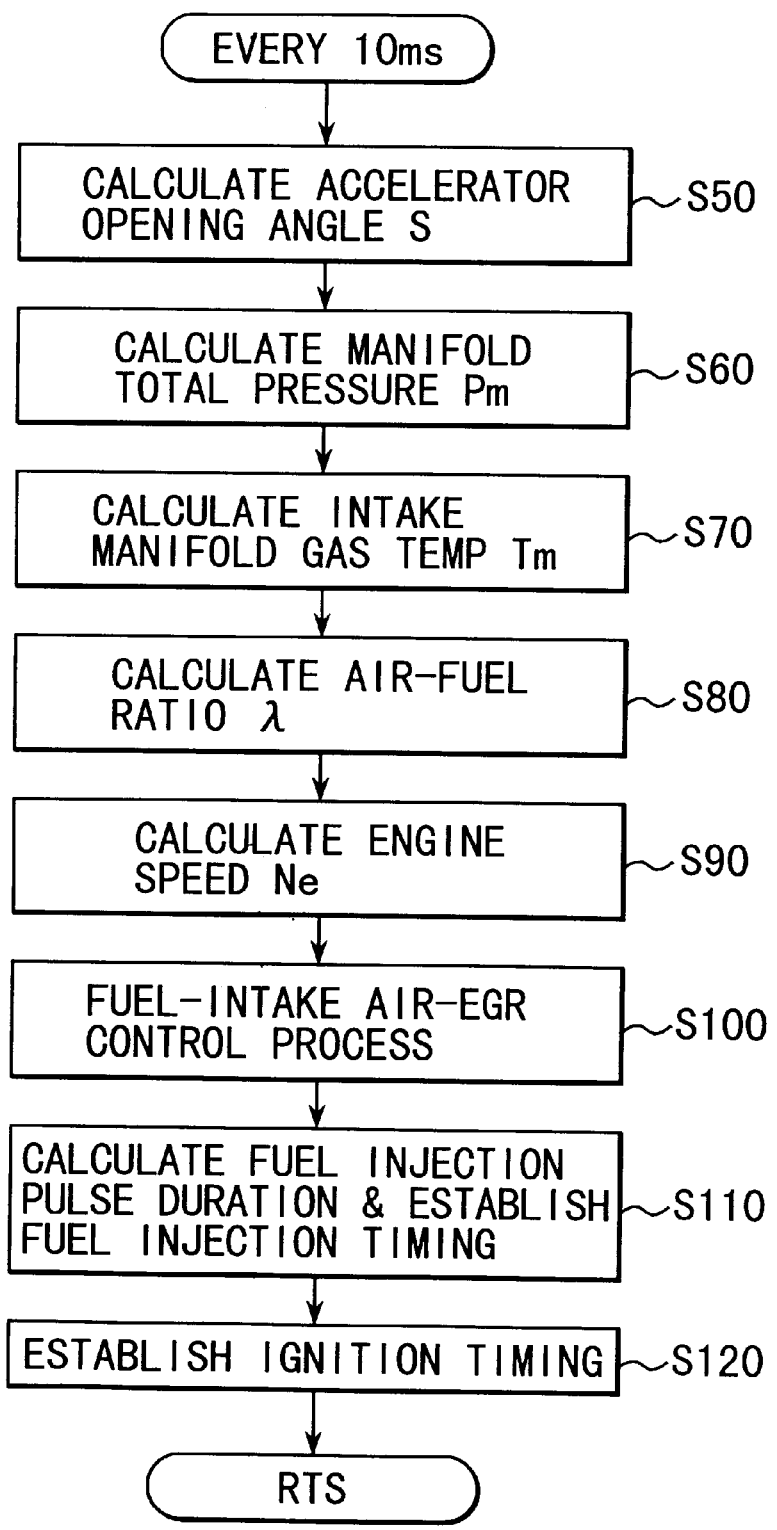
FIG. 4 is a flowchart illustrating a basic control routine executed periodically.
Figure 6:
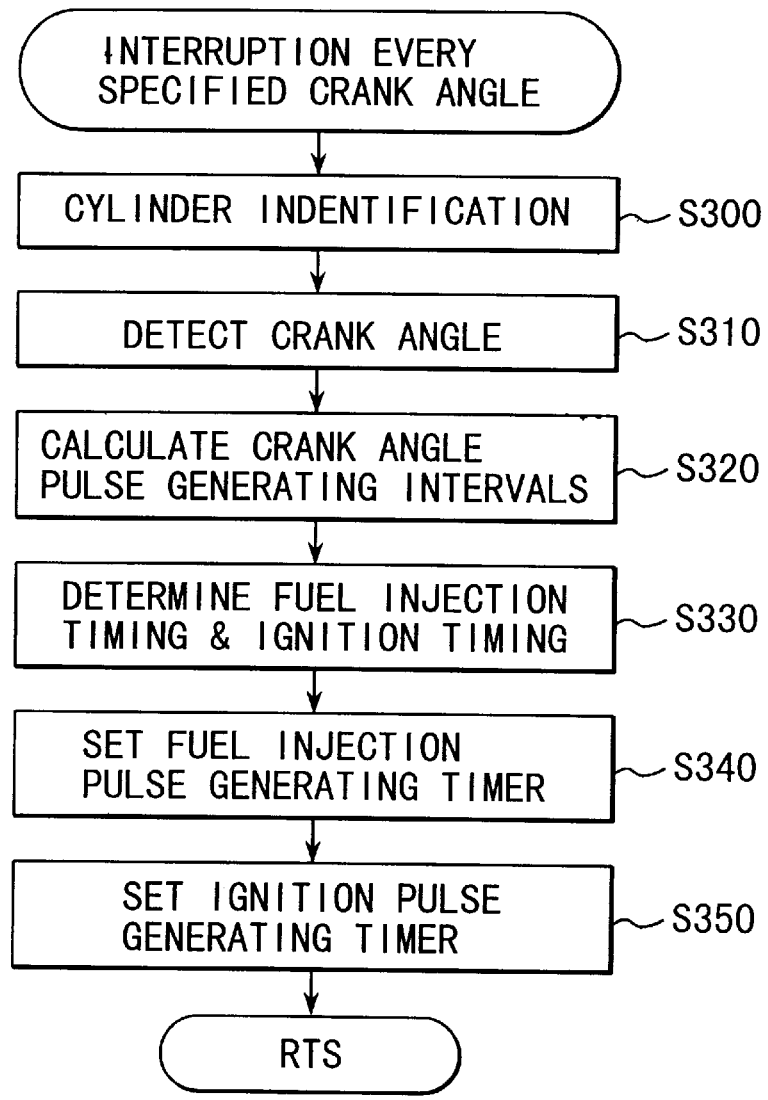
FIG. 6 is a flowchart illustrating a control routine executed every specified crank angle.

After the initialization of the system, the periodically processed routine shown in FIG. 4 is executed every specified time (for example, every 10 milliseconds) and at the same time the routine shown in FIG. 6 is carried out being interrupted by every input of the crank pulse.

In the periodically processed routine shown in FIG. 4, first, at S50 an accelerator opening angle S is calculated by applying an A/D conversion to an output of the accelerator opening angle sensor 4 and then at S60 a manifold total pressure Pm is calculated by applying an A/D conversion to an output of the intake manifold pressure sensor 5. Further, at S70 an output of the intake manifold temperature sensor 6 is subjected to an A/D conversion to calculate a gas temperature Tm within the intake manifold.

Next, the program goes to S80 where an output of the air-fuel ratio sensor 7 is subjected to an A/D conversion and an air-fuel ratio ) is calculated. Then, at S90 an engine speed Ne is calculated based on an elapsed time while the crank shaft rotates 180°. The elapsed time of the crank shaft rotation is calculated by an interrupt routine illustrated in FIG. 6. At S100, a fuel-air-EGR control routine illustrated in FIG. 5 is carried out to calculate a basic fuel injection amount Gf*, a throttle actuator indicating value Sa and an EGR valve indicating value Se based on an target engine torque $Te^i$.

Then, the program steps to S110 where the basic fuel injection amount Gf* is converted into a fuel injection pulse duration Tout after being corrected by miscellaneous correction coefficients or being added by invalid factors. Further, a fuel injection timing Tinj is determined by referring to a map parameterizing the engine speed Ne and the target engine torque $Te^i$. At S120, an ignition timing Tig is established by referring to a map parameterizing the engine speed Ne and the target engine torque $Te^i$ and then the program leaves the routine.

Figure 5:
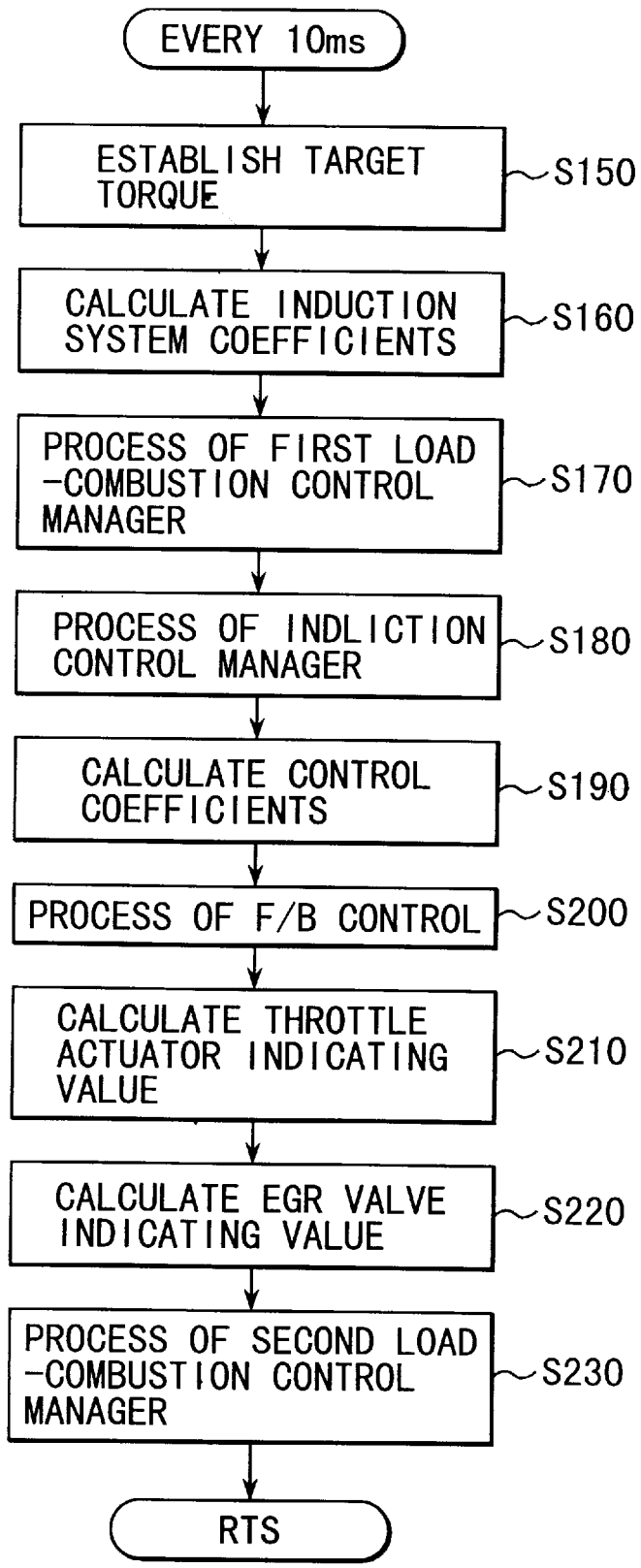
FIG. 5 is a flowchart illustrating a control routine for performing the fuel control, intake air control and EGR control.

Describing the fuel-intake air-EGR control routine mentioned at S100 with reference to FIG. 5, at S150 a target engine torque $Te^i$ is determined by looking up a map parameterizing the engine speed Ne and the accelerator opening angle S. Then, at S160, the induction system coefficients are calculated. First, a volumetric efficiency $\eta_v$ is obtained by referring to a map parameterizing the engine speed Ne and the manifold total pressure Pm. Then, a target volumetric efficiency $\eta_v^*$ corresponding to the target pressure is obtained from the map by reading the engine speed Ne and the target manifold total pressure $Pm^{*i}_{(-1)}$ preceding one control cycle. The induction system coefficients are calculated according to the following equations:

$$c_a = a/b_a = (Vs/(Ra \cdot Tm)) \cdot \eta_v \cdot (Ne \cdot L/120) \qquad (11)$$

$$c_e = a/b_e = (Vs/(Ra \cdot Tm)) \cdot \eta_v \cdot (Ne \cdot L/120) \qquad (12)$$

$$d = (Vs/(Ra \cdot Tm)) \cdot \eta_v \qquad (13)$$

$$d^* = (Vs/(Ra \cdot Tm)) \cdot \eta_v^* \qquad (14)$$

where Ne is an engine speed, Tm is a gas temperature, Vm, Vs, L, Ra and Re are induction system constants, a, $b_a$, $b_e$ are induction system coefficients according to the aforementioned equations (7) through (9).

At S170, a basic fuel injection amount, an initial set value $Gf^i$, an EGR set value EGRS and an in-cylinder equivalent ratio set value $fai^i$ are established by referring to maps, respectively and at S180 a process on the induction control manager is proceeded.

The process on the induction control manager 34 will be described. First, an equivalent ratio of EGR gas at the inlet of the EGR valve 14 is assumed from the established in-cylinder equivalent ratio set value $fai^i$. The obtained equivalent ratio of EGR gas is denoted as fai. Further, an air components partial pressure target initial set value $Pmo^{*i}$, a non-air components partial pressure target initial set value $Pmee^{*i}$ and a manifold total pressure target initial set value $Pm^{*i}$ are calculated from the assumed equivalent ratio fai, the equivalent ratio set value $fai^i$, the basic fuel injection amount initial set value $Gf^i$, the EGR set value EGRS, the induction system coefficient d* and the theoretical air-fuel ratio ABFT according to the following equations (15) to (17).

$$Pmo^{*i} = (1/d^*) \cdot Gf^i \cdot ABFT/fai^i \qquad (15)$$

$$Pmee^{*i} = ((fai \cdot EGRS)/(1 - fai \cdot EGRS)) \cdot (Re/Ra) \cdot Pmo^{*i} \qquad (16)$$

$$Pm^{*i} = Pmo^{*i} + Pmee^{*i} \qquad (17)$$

Since an equivalent ratio calculated from the actual air-fuel ratio λ is used, the assumed equivalent ratio fai provides a most excellent accuracy in case where the air-fuel ratio sensor 7 belongs to a wide-range type. However, as an alternative means, the assumed equivalent ratio may be obtained by the calculation as follows:

$$fai = (1-q) \cdot fai_{(-1)} + q \cdot fai^i_{(-k)} \qquad (18)$$

where q is a weighted mean coefficient when taking a delivering time lag of combustion gas into consideration, $fai_{(-1)}$ is an equivalent ratio set value of first order lag and $fai^i_{(-k)}$ is an equivalent ratio set value preceding the "k" th control cycle.

Further, in case where the assumed equivalent ratio fai is obtained according to the equation (18), a predetermined constant may be used as a weighted mean coefficient q but it is desirable that the weighted mean coefficient q is to be established based on the intake manifold total pressure Pm and that the equivalent ratio set value $fai^i_{(-k)}$ is a value corresponding to a dead time determined from the engine speed Ne and the manifold total pressure Pm because the delivering time lag of combustion gas varies as the engine operating condition varies.

The equivalent ratio set value $fai^i$ may be established to be the assumed equivalent ratio fai itself, as shown in the following equation (19).

$$fai = fai^i \qquad (19)$$

Then, the program steps to S190 where feed-back coefficients f1, f2, h1, h2, g1 and g2 are calculated from the induction system coefficients $b_a$, $b_e$, $c_a$ and $c_e$ and the assumed equivalent ratio fai according to the following equations.

$$f1 = (1/(b_a \cdot dt)) \cdot n \qquad (20)$$

$$f2 = (1/(fai \cdot b_e \cdot dt)) \cdot n \qquad (21)$$

$$h1 = c_a \qquad (22)$$

$$h2 = c_e fai \qquad (23)$$

$$g1 = g \qquad (24)$$

$$g2 = g \qquad (25)$$

where dt is a control cycle, n is a weighted coefficient (0<n<1) and g is an integration control coefficient (g≧0).

At S200, an air flow set value Qa passing through the throttle and a gas flow set value Qe passing through the EGR valve are calculated. In this step, in order to assume the time-versus variation of air components partial pressure and the one of non-air components partial pressure, first, the air components partial pressure model value Pfo and the non-air components partial pressure model value Pfee are calculated and then based on these values Pfo and Pfee, an air components partial pressure assumed value Pmo and a non-air components partial pressure assumed value Pmee are calculated.

Next, a gas flow Qe passing through the EGR valve is obtained by feeding-back the deviation of the non-air components partial pressure target initial set value Pmee*$^i$ from the non-air components partial pressure assumed value Pmee which have been calculated at S180. Further, similarly, using the gas flow Qe passing through the EGR valve, an air flow Qa passing through the throttle is obtained by feeding-back the deviation of the air components partial pressure target initial set value Pmo*$^i$ from the air components partial pressure assumed value Pmo which have been calculated at S180.

Specifically, respective partial pressure model values Pfo, Pfee are calculated according to equations (26) and (27) as follows:

$$Pfo = (1 - a \cdot dt) \cdot Pfo_{(-1)} + (b_a \cdot dt) \cdot Qa_{(-1)} + (b_a \cdot dt) \cdot (1 - fai) \cdot Qe_{(-1)} \qquad (26)$$

$$Pfee = (1 - a \cdot dt) \cdot Pfee_{(-1)} + (b_e \cdot dt) \cdot fai \cdot Qe_{(-1)} \qquad (27)$$

where a, $b_a$ and $b_e$ are induction system coefficients, fai is an assumed equivalent ratio, $Qa_{(-1)}$ is an air flow preceding one control cycle, $Qe_{(-1)}$ is an EGR gas flow preceding one control cycle and $Pfo_{(-1)}$ is an air components partial pressure model value preceding one control cycle, $Pfee_{(-1)}$ is a non-air components partial pressure model value preceding one control cycle.

Next, employing thus calculated partial pressure model values Pfo, Pfee and the manifold total pressure Pm measured by the intake manifold pressure sensor 5, an air components partial pressure assumed value Pmo is calculated according to an equation (28) and further, an non-air components partial pressure assumed value Pmee is calculated using the following equation (29).

$$Pmo = Pfo + (Pfo/(Pfo + Pfee)) \cdot (Pm - (Pfo + Pfee)) \qquad (28)$$

$$Pmee = Pm - Pmo \qquad (29)$$

Then, using the non-air components partial pressure target initial set value Pmee*$^i$, the non-air components partial pressure assumed value Pmee and the feed-back coefficients f2, h2 and g2, an EGR gas flow initial set value Qe$^i$ is calculated according to the following equation:

$$Qe^i = h2 \cdot Pmee + f2 \cdot (Pmee^{*i} - Pmee) \qquad (30)$$

There is a case where thus calculated EGR gas flow initial set value Qei goes out of a controllable range and therefore, in this embodiment, in order to make this value realistic, an EGR gas flow set value Qe is established in accordance with an inequality (31):

$$0 \leq Qe \leq (Qe)_{max}. \qquad (31)$$

where $(Qe)_{max}$ is a maximum EGR gas flow value.

That is to say, if Qe$^i$ is below 0, Qe is set to be 0;

if Qe$^i$ exceeds $(Qe)_{max}$, Qe is set to be $(Qe)_{max}$; and if Qe$^i$ is between 0 and $(Qe)_{max}$, Qe is set to Qe$^i$.

This process is so-called "saturation" or "to saturate". In this case, the maximum EGR gas flow $(Qe)_{max}$ may be an empirically determined value, however, a more accurate F/B control can be realized, if $(Qe)_{max}$ is retrieved from a map based on the manifold total pressure Pm, because the controllable EGR gas flow is dependent on the manifold total pressure Pm.

Further, a still more accurate F/B control can be realized by using the maximum EGR gas flow $(Qe)_{max}$ calculated from the equation (32).

Since the controllable EGR gas flow is limited by the intake manifold total pressure Pm and the EGR valve indicating value $Se_{(-1)}$ preceding one control cycle, using the EGR gas flow set value $Qe_{(-1)}$ preceding one control cycle and a maximum EGR gas flow variation $(\Delta Qe)_{max}$ which is determined from the manifold total pressure Pm and the EGR valve indicating value $Se_{(-1)}$ preceding one control cycle, the maximum EGR gas flow $(Qe)_{max}$ is calculated.

$$(Qe)_{max} = Qe_{(-1)} + (\Delta Qe)_{max} \qquad (32)$$

Then, using the EGR gas flow set value Qe, the air components partial pressure assumed value Pmo, the air components partial pressure target initial set value Pmo*$^i$, the estimated equivalent ratio fai, and the feed-back coefficients f1, h1 and g1, an air flow initial set value Qa$^i$ passing through the throttle valve is calculated according to the following equation (33):

$$Qa^i = h1 \cdot Pmo + f1 \cdot (Pmo^{*i} - Pmo) - (1 - fai) \cdot Qe \qquad (33)$$

Further, the air flow set value Qa passing through the throttle valve is determined so that the calculated air flow initial set value Qa$^i$ comes within a range as shown by the following inequality (34).

$$0 \leq Qa \leq (Qa)_{max} \qquad (34)$$

where $(Qa)_{max}$ is a maximum EGR gas flow passing through the EGR valve.

In this case, the maximum air flow $(Qa)_{max}$ may be an empirically determined value or may be retrieved from a map based on the intake manifold total pressure Pm taking the controllable flow into consideration. Further, the maximum air flow $(Qa)_{max}$ passing through the throttle may be calculated according to the following equation (35), using the air flow set value $Qa_{(-1)}$ preceding one control cycle and a maximum air flow variation $(\Delta Qa)_{max}$ which is determined from the manifold total pressure Pm and the throttle actuator instructing value $Sa_{(-1)}$ preceding one control cycle.

$$(Qa)_{max} = Qa_{(-1)} + (\Delta Qa)_{max} \qquad (35)$$

After the processes in the F/B control section 36 is finished, the program goes to S210 where a throttle actuator instructing value Sa is calculated based on the air flow Qa passing through the throttle which has been calculated at S200 and the manifold total pressure Pm, by referring to a map. Further, at S220, an EGR valve instructing value Se is calculated based on the EGR gas flow set value Qe and the manifold total pressure Pm, by referring to a map, and then the program steps to S230.

At S230, a final basic fuel injection amount Gf* is established and then the program leaves the routine. The basic fuel injection amount initial set value $Gf^i$ is assigned to the final basic fuel injection amount Gf* as it is. The direct use of the basic fuel injection amount initial set value $Gf^i$ provides an avoidance of erroneous fuel metering due to the time lag of air flow measurement and enables the engine to generate torque well responsive to a driver's accelerator work under transient operating conditions.

$$Gf^*=Gf^i \qquad (36)$$

Alternatively, using the air components partial pressure assumed value Pmo, the equivalent ratio set value $fai^i$, the induction system coefficient d and the theoritical target air-fuel ratio ABFT, the final basic fuel injection amount Gf* may be calculated in accordance with the following equation. This is a D-jetronic-like method in which the fuel injection amount is determined based on an actual intake manifold pressure.

$$Gf^*=d \cdot Pmo \cdot fai^i/ABFT \qquad (37)$$

Describing the interrupt routine in FIG. 6, first at S300 the present cylinder is identified according to the number of pulses generated from the cylinder number detecting sensor 3 between crank pulses of the crank angle sensor 2 and further the subsequent cylinders are identified by the following crank pulses. At S310, specific crank angular positions are detected.

Figure 8:
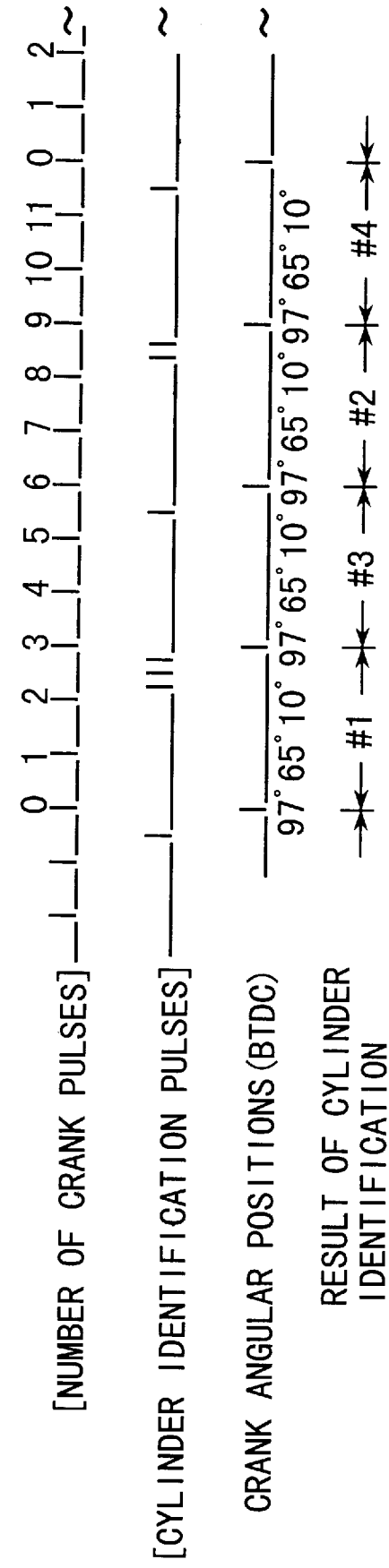
FIG. 8 is an explanatory diagram showing processes for identifying cylinders.

Referring to FIG. 8, in this embodiment, crank pulses are generated at BTDC 97°, 65° and 10° of each cylinder from the crank angle sensor 2. On the other hand, three cylinder identifying pulses are outputted between BTDC 97° of #3 cylinder and BTDC 10° of #1 cylinder which is a preceding firing cylinder, two cylinder identifying pulses are outputted between BTDC 97° of #4 cylinder and BTDC 10° of #2 cylinder which is a preceding firing cylinder, one cylinder identifying pulse is outputted between BTDC 97° of #1 and #2 cylinders and BTDC 10° of the preceding firing cylinder.

Accordingly, a crank pulse which comes after three cylinder identifying pulses is identified as a crank pulse at BTDC 97° of #3 cylinder, a crank pulse which comes after two cylinder identifying pulses is identified as a crank pulse at BTDC 97° of #4 cylinder and a crank pulse which comes after one cylinder identifying pulse is identified as a crank pulse at BTDC 97° of #1 or #2 cylinder, that is, if a previously identified cylinder is #4, the cylinder is #1 cylinder, and if it is #3, the cylinder is #2 cylinder.

The crank positions of BTDC 65° and BTDC 10° are judged from the number of crank pulses after BTDC 97°, i.e., counting the number of inputted pulses like 1, 2, 3 and so on after the crank pulse at BTDC 97° of #1 cylinder is inputted, the crank position is judged according to the counted number of pulses.

At S320, an elapsed time from the previous crank interruption, that is, an elapsed time from the previous input of crank pulse to the present input of crank pulse is measured. Specifically, in this embodiment, an elapsed time from the input of the BTDC 10° CA pulse of a given cylinder to the input of BTDC 97° CA pulse of a next firing cylinder is measured and memorized as MT 93 ("93" denotes a crank angle difference 93° between BTDC 10° CA and BTDC 97° CA), an elapsed time from the input of BTDC 97° CA to BTDC 65° CA is measured and memorized as MT 32, and an elapsed time from the input of BTDC 65° CA to BTDC 10° CA is measured and memorized as MT 55, respectively. A total of thus measure elapsed times MT93, MT32 and MT55 is 180° CA which is employed for the calculation of the engine speed Ne.

At S330, fuel injection timing and ignition timing are determined. The fuel injection timing Tinj established in the periodically processed routine is converted into a fuel injection timing corresponding to a specified crank angle and the ignition timing Tig established in the periodically processed routine is converted into an ignition timing corresponding to a specified crank angle.

Further, at S340, when the present crank angle interruption has coincided with an interruption at the predetermined specific crank angle, the fuel injection pulse generating timer is set. Then, at S350, if the present crank angle interruption has coincided with an interruption at the predetermined specific crank angle, the ignition pulse generating timer is set and the program leaves the routine. As a result, a fuel injection pulse is outputted at the fuel injection timing determined at the step S330 to the fuel injector 10 to inject fuel. Further, an ignition pulse is outputted at the ignition timing determined at the step S330 to the ignition coil 11 to spark the spark plug 12.

According to the first embodiment of the present invention, since the induction control and the EGR control are performed with respect to the fuel injection amount corresponding to the target engine torque, while the air components and the non-air components are assumed respectively, the delay of response of air and EGR gas when they are charged into the intake manifold volume downstream of the throttle valve and the delay of response of the mechanical operation in the throttle system and the EGR system can be compensated and further the effect of the difference of response between the throttle system and the EGR system can be deleted. Further, since an actual intake air flow resulted from the throttle operation is fed-back, the flow deviation due to the variation of individual throttle valves, the flow change caused by the change of the opening area due to the temperature change of the throttle valve, and the flow change due to stains of the throttle valve can be prevented and the responseability of the control system is greatly improved.

Stating these advantages in other words, since the engine control system according to the first embodiment of the present invention has realized an optimization of the fuel injection amount, optimization of the intake air amount and optimization of the EGR amount, not only driveability can be improved and emissions can be reduced, but also the controllability can be improved over a wide range of air-fuel ratios from stichiometric to lean and an arbitrary air-fuel ratio control according to the engine operating conditions is realized.

Figure 9:
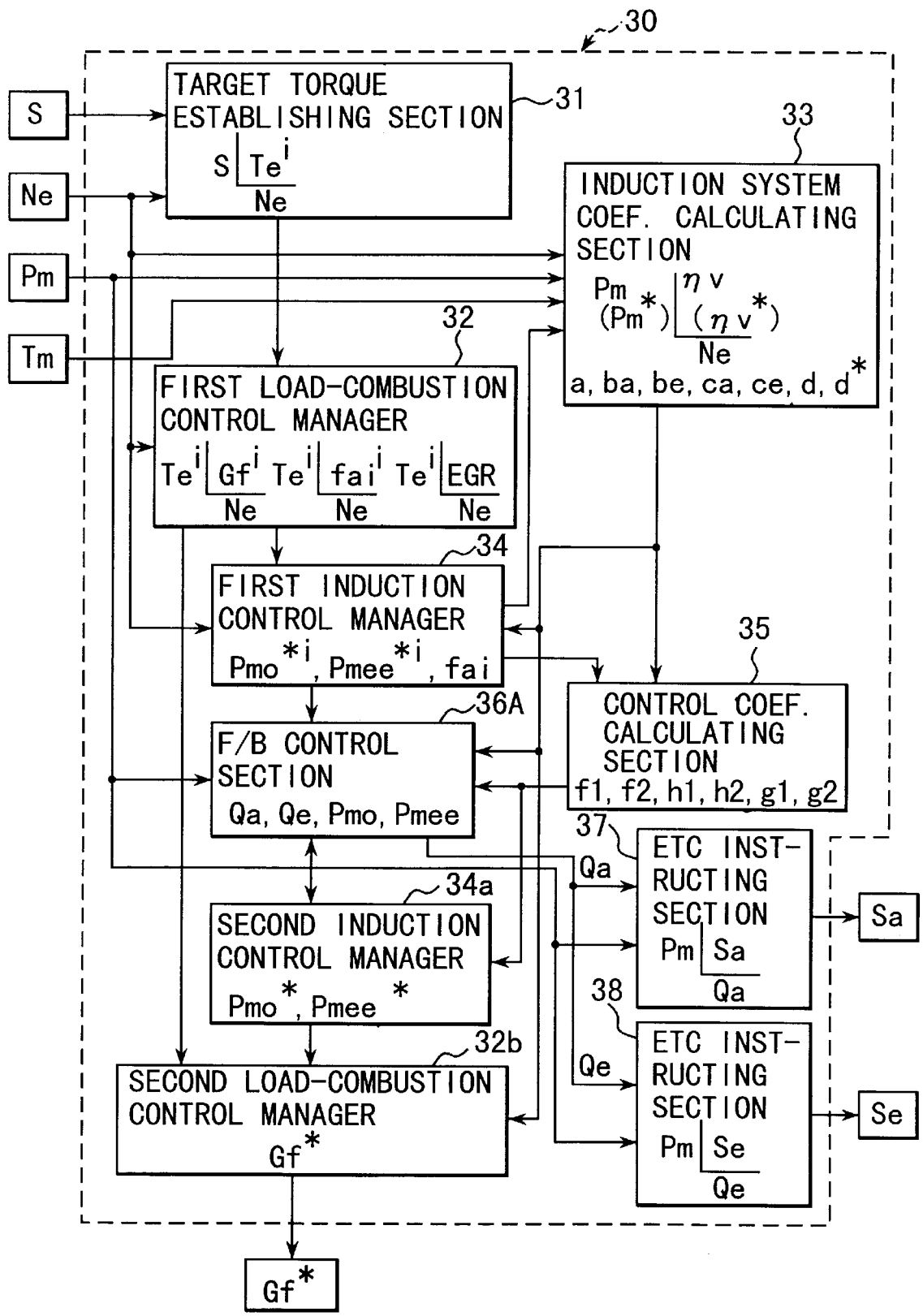
FIG. 9 is a block diagram of the fuel control, intake air control and EGR control according to a second embodiment of the present invention.
Figure 10:
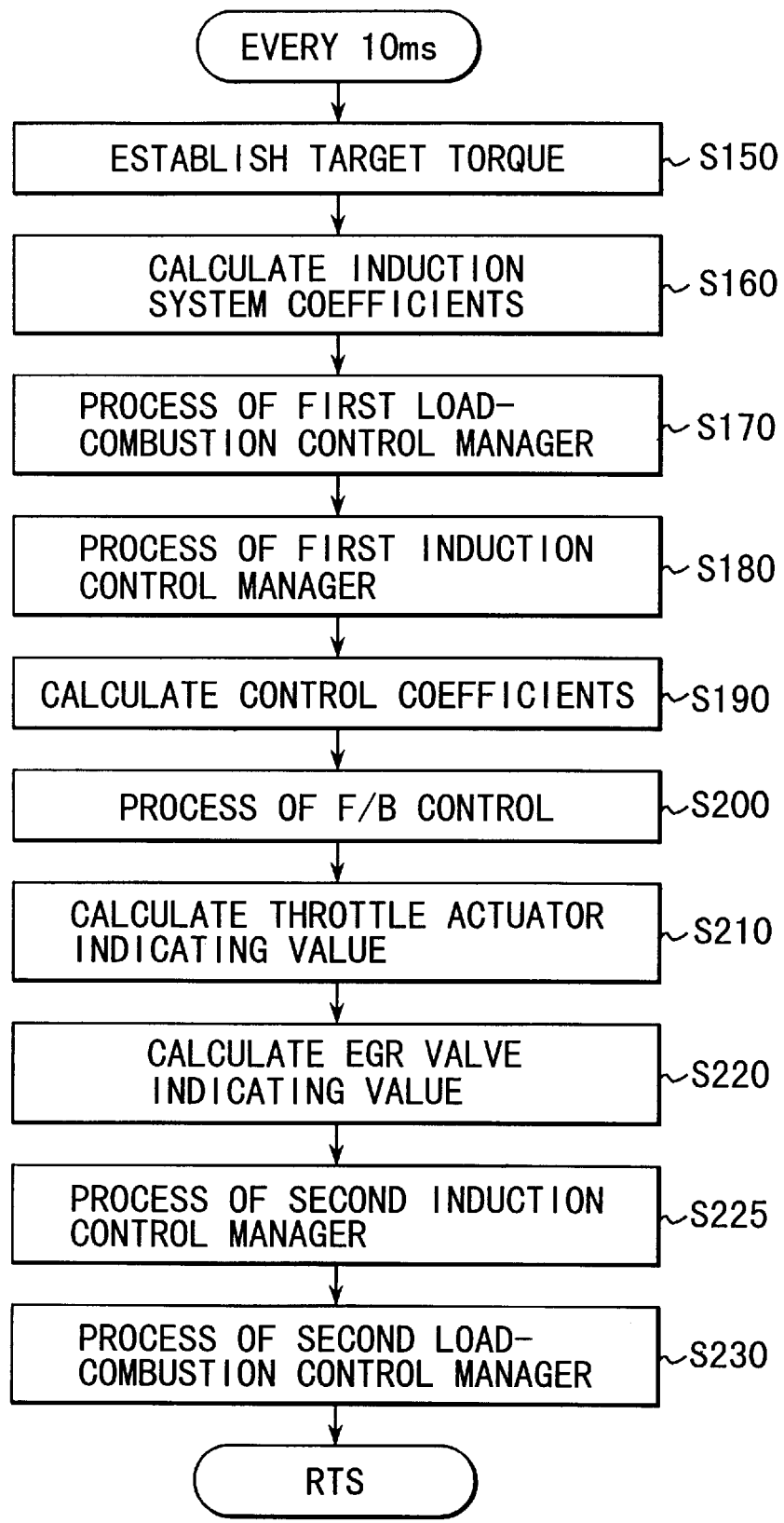
FIG. 10 is a flowchart illustrating a control routine for performing the fuel control, intake air control and EGR control.

FIGS. 9 and 10 relate to a second embodiment of the present invention, in which FIG. 9 is a block diagram showing a fuel-intake air-EGR control section and FIG. 10 is a flowchart of a fuel-intake air-EGR control routine.

In this embodiment, the fuel-intake air-EGR control section 30 has been changed as follows:

The induction control manager 34 of the first embodiment is changed to a first induction control manager 34; the F/B control section 36 of the first embodiment is changed to a F/B control section 36A with some modifications introduced; the second load-combustion control manager 32a of the first embodiment is changed to a second load-combustion control manager 32b with some modifications introduced; and a second induction control manager 34a is newly added to the second embodiment.

In the second induction control manager 34a, a non-air components partial pressure estimated value Pmee* and an air components partial pressure estimated value Pmo* are calculated. The non-air components partial pressure estimated value Pmee* and air components partial pressure estimated value Pmo* are theoretical pressure response estimated values of non-air components and air components, respectively. Further, in the F/B control section 36A, an EGR gas flow initial set value $Qe^i$ passing through the EGR valve is calculated using a time integral value of the deviation between the non-air components partial pressure estimated value Pmee* and the non-air components partial pressure assumed value Pmee and an air flow initial set value $Qa^i$ passing through the throttle valve is calculated using a time integral value of the deviation between the air components partial pressure estimated value Pmo* and the air components partial pressure assumed value Pmo. Further, in the second load-combustion control manager 32b, a final basic fuel injection amount Gf* is calculated using the air components partial pressure estimated value Pmo*.

The difference between the flowchart shown in FIG. 5 according to the first embodiment and the one shown in FIG. 10 according to the second embodiment is as follows:

First, the contents of the step S200 have been changed from the process in the F/B control section 36 to the process in the F/B control section 36A, secondly, the contents of the step S230 have been changed from the process in the load-combustion control manager 32a to the process in the load-combustion control manager 32b and thirdly a new step S225 has been inserted between the step S220 and the S230. The newly inserted step S225 is a step where the second induction control manager 34a is associated with.

With respect to the process at S200 by the F/B control section 36A, similarly to the first embodiment, the air components partial pressure assumed value Pmo and the non-air components partial pressure assumed value Pmee are calculated respectively and after that the EGR gas flow initial set value $Qe^i$ and the air flow initial set value $Qa^i$ are calculated respectively. In the second embodiment, as shown in the following equations (38) and (39), a term of the time integral value preceding one control cycle is added to respective equations.

$$Qe^i = h2 \cdot Pmee + f2 \cdot (Pmee^{*i} - Pmee) + g2 \cdot Imee_{(-1)} \quad (38)$$

$$Qa^i = h1 \cdot Pmo + f1 \cdot (Pmo^{*i} - Pmo) - (1 - fai) \cdot Qe + g1 \cdot Imo_{(-1)} \quad (39)$$

where $Imee_{(-1)}$ is a time integral value preceding one control cycle of the non-air components partial pressure error and $Imo_{(-1)}$ is is a time integral value preceding one control cycle of the air components partial pressure error.

Similarly to the first embodiment, thus calculated EGR gas flow initial set value $Qe^i$ and air flow initial set value $Qa^i$ passing are established to be an EGR gas flow set value Qe passing through the EGR valve and air flow set value Qa passing through the throttle valve, respectively. These established values Qe and Qa are, similarly to the first embodiment, adjusted so as to fall into the inequalities as shown in (31) and (34).

In the process at S225 associated with the second induction control manager 34a, an air components partial pressure target correction value Pmoh* which is a pressure target value corresponding to the established air flow passing through the throttle valve is calculated according to the following equation (40):

$$Pmoh^* = (1/f1) \cdot (Qa + (1-fai) \cdot Qe + (f1-h1) \cdot Pmo - g1 \cdot Imo_{(-1)}) \quad (40)$$

where Pmo is a is an air components partial pressure assumed value, Qa is an air flow set value passing through the throttle valve, Qe is an EGR gas flow set value passing through the EGR valve, fai is an equivalent ratio assumed value, $Imo_{(-1)}$ is a time integral value preceding one control cycle of the air components partial pressure error, and f1, h1 and g1 are feed-back coefficients.

Further, a non-air components partial pressure target correction value Pmeeh* which is a pressure target value corresponding to the established EGR gas flow passing through the EGR valve is calculated according to the following equation (41):

$$Pmeeh^* = (1/f2) \cdot (Qe + (f2-h2) \cdot Pmee - g2 \cdot Imee_{(-1)}) \quad (41)$$

where Pmee is a is a non-air components partial pressure assumed value, Qe is an EGR gas flow set value passing through the EGR valve, $Imee_{(-1)}$ is a time integral value preceding one control cycle of the non-air components partial pressure error, and f2, h2 and g2 are feed-back coefficients.

Further, an air components partial pressure estimated value Pmo* is calculated according to the following equation (42):

$$Pmo^* = (1 - f1 \cdot b_a \cdot dt) \cdot Pmo^*_{(-1)} + (f1 \cdot b_a \cdot dt) \cdot Pmoh^* \quad (42)$$

where Pmoh* is an air components partial pressure target correction value, $Pmo_{(-1)}$ is an air components partial pressure estimated value preceding one control cycle, f1 is a feed-back coefficient, and $b_a$ is an induction system coefficient.

Further, a non-air components partial pressure estimated value Pmee* is calculated according to the following equation (43):

$$Pmee^* = (1 - f2 \cdot fai \cdot b_e \cdot dt) \cdot Pmee^*_{(-1)} + (f2 \cdot fai \cdot b_e dt) \cdot Pmeeh^* \quad (43)$$

where Pmeeh* is a non-air components partial pressure target correction value, $Pmee_{(-1)}$ is a non-air components partial pressure estimated value preceding one control cycle, f2 is a feed-back coefficient, and $b_e$ is an induction system coefficient.

Further, a time integral value Imo of an error between the air components partial pressure assumed value Pmo and the air components partial pressure estimated value Pmo* which has been calculated by the equation (42), is calculated according to the following equation (44). Similarly, a time integral value Imee of an error between the non-air components partial pressure assumed value Pmee and the no-air components partial pressure estimated value Pmee* which has been calculated by the equation (43), is calculated according to the following equation (45).

$$Imo = Imo_{(-1)} + (Pmo^* - Pmo) \cdot dt \quad (44)$$

$$Imee = Imee_{(-1)} + (Pmee^* - Pmee) \cdot dt \quad (45)$$

In a more simple way, as shown in the following equations (46) and (47), the air components partial pressure target correction value Pmoh* and the non-air components partial pressure target correction value Pmeeh* can be established to be an air components partial pressure target initial set value $Pmo^{*i}$ and a non-air components partial pressure target initial set value $Pmee^{*i}$, respectively, whereby the computation load on the CPU can be greatly lightened, although the control accuracy is somewhat deteriorated.

$$Pmoh^* = Pmo^{*i} \quad (46)$$

$$Pmeeh^* = Pmee^{*i} \quad (47)$$

In the processes of the F/B control section 36A, when the EGR gas flow initial set value $Qe^i$ and the air flow initial set value $Qa^i$ are saturated respectively within the range from 0 to the respective maximum flows, a saturation flag E and a saturation flag A is set or cleared respectively according to the size of the initial set value and the maximum flow and further, in the processes of the second induction control manager 34a, the time integral value Imo of the air components partial pressure error and the time integral value Imee of the non-air components partial pressure error are established respectively according to the values of these flags, thereby the computation load on the CPU can be reduced with some degree of the control accuracy retained.

That is to say, when the EGR gas flow initial set value $Qe^i$ is equal to the EGR gas flow set value Qe, the saturation flag E is cleared and when the EGR gas flow initial set value $Qe^i$ is not equal to the EGR gas flow set value Qe, the saturation flag E is set. Similarly, when the air flow initial set value $Qa^i$ is equal to the air flow set value Qa, the saturation flag A is cleared and when the air flow initial set value $Qa^i$ is not equal to the air flow set value Qa, the saturation flag A is set.

Further, when both flags A and E are cleared, the time integral value Imo of the air components partial pressure error is calculated according to the above equation (44) and when either of the flags A and E is set, the time integral value Imo of the air components partial pressure error is established to be the value preceding one control cycle according to the following equation (48). Similarly, when the flag E is cleared, the time integral value Imee of the non-air components partial pressure error is calculated according to the above equation (45) and when the flag E is set, the time integral value Imee of the non-air components partial pressure error is established to be the value preceding one control cycle according to the following equation (49).

$$Imo = Imo_{(-1)} \quad (48)$$

$$Imee = Imee_{(-1)} \quad (49)$$

In the processes of the second load-combustion control manager 32b, a final basic fuel injection amount Gf* is calculated based on the-air components partial pressure estimated value Pmo* calculated in the second induction control manager 34a, the equivalent ratio set value $fai^i$, the induction system coefficient d and the theoretical air-fuel ratio ABFT in accordance with the following equation (50):

$$Gf^* = d \cdot Pmo^* \cdot fai^i / ABFT \quad (50)$$

In calculating this final basic fuel injection amount Gf*, it is possible to introduce the processes in the second load-combustion control manager 32a according to the first embodiment without using the air components partial pressure estimated value Pmo* which is calculated by the second load-combustion control manager 32b of this embodiment, however, as described in this embodiment, it is also possible to estimate theoretically the response value of the intake manifold pressure with respect to the present control operation amount by use of the air components partial pressure estimated value Pmo*. This way of calculation can avoid a delay caused in the actual induction system due to the mechanical time lag of the throttle valve and EGR valve operations and the like. Further, the latter way of calculation can delete an effect of pulsation in the induction system and improve a follow-up ability with respect to the transient change of the air amount, whereby a high accuracy control emphasized on the air-fuel ratio formation can be realized.

Further, according to the second embodiment of the present invention, in performing a feed-back control with respect to the actual intake air amount determined by the operation of the throttle system, since the EGR gas flow initial set value $Qe^i$ and the air flow initial set value $Qa^i$ are calculated using the integral values Imee, Imo of the control error, respectively, the follow-up ability of target values with respect to disturbance can be improved and this results in a substantial improvement in the F/B control accuracy, compared to the first embodiment.

Figure 11:
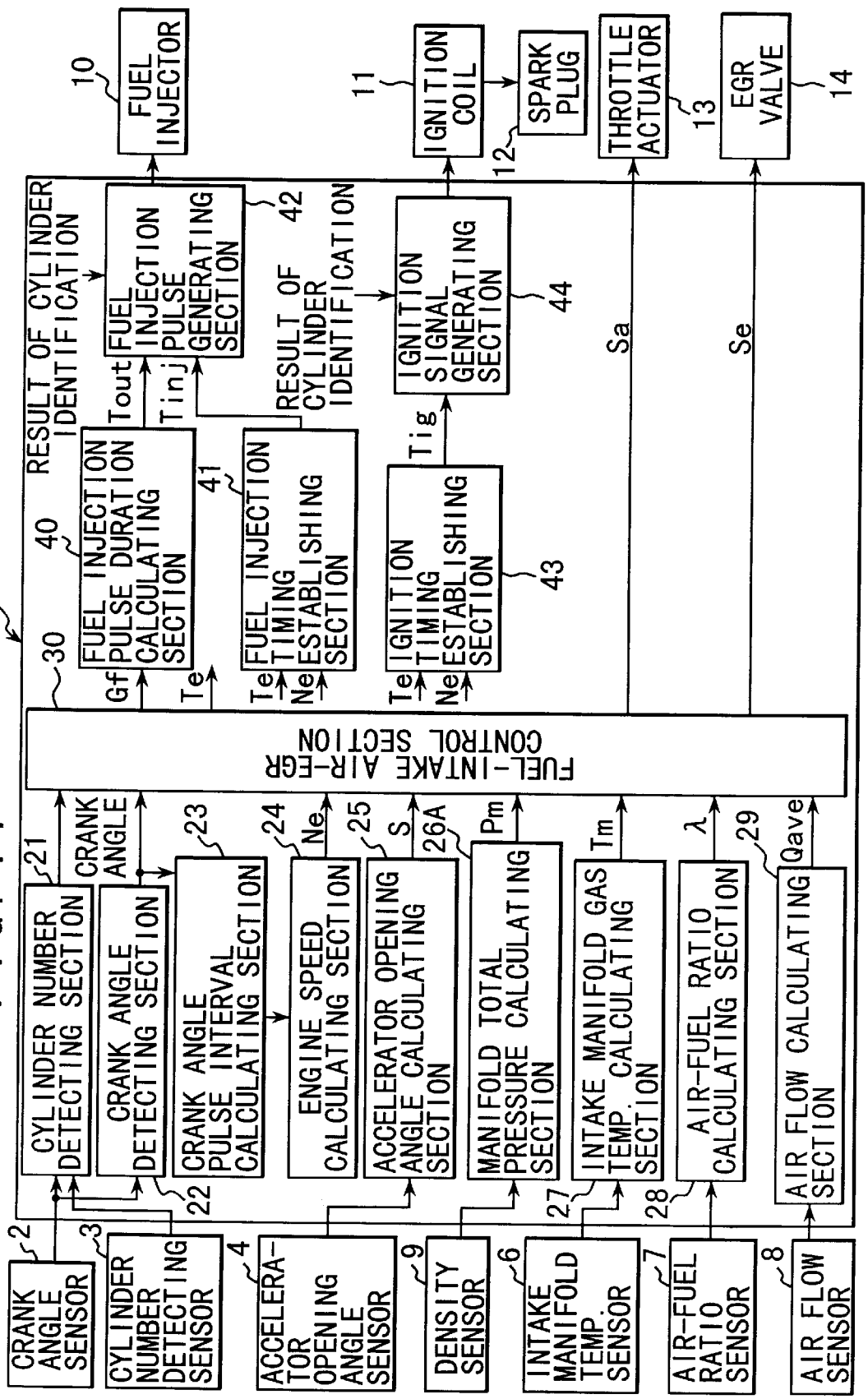
FIG. 11 is an overall block diagram of the engine control system according to a third embodiment.
Figure 12:
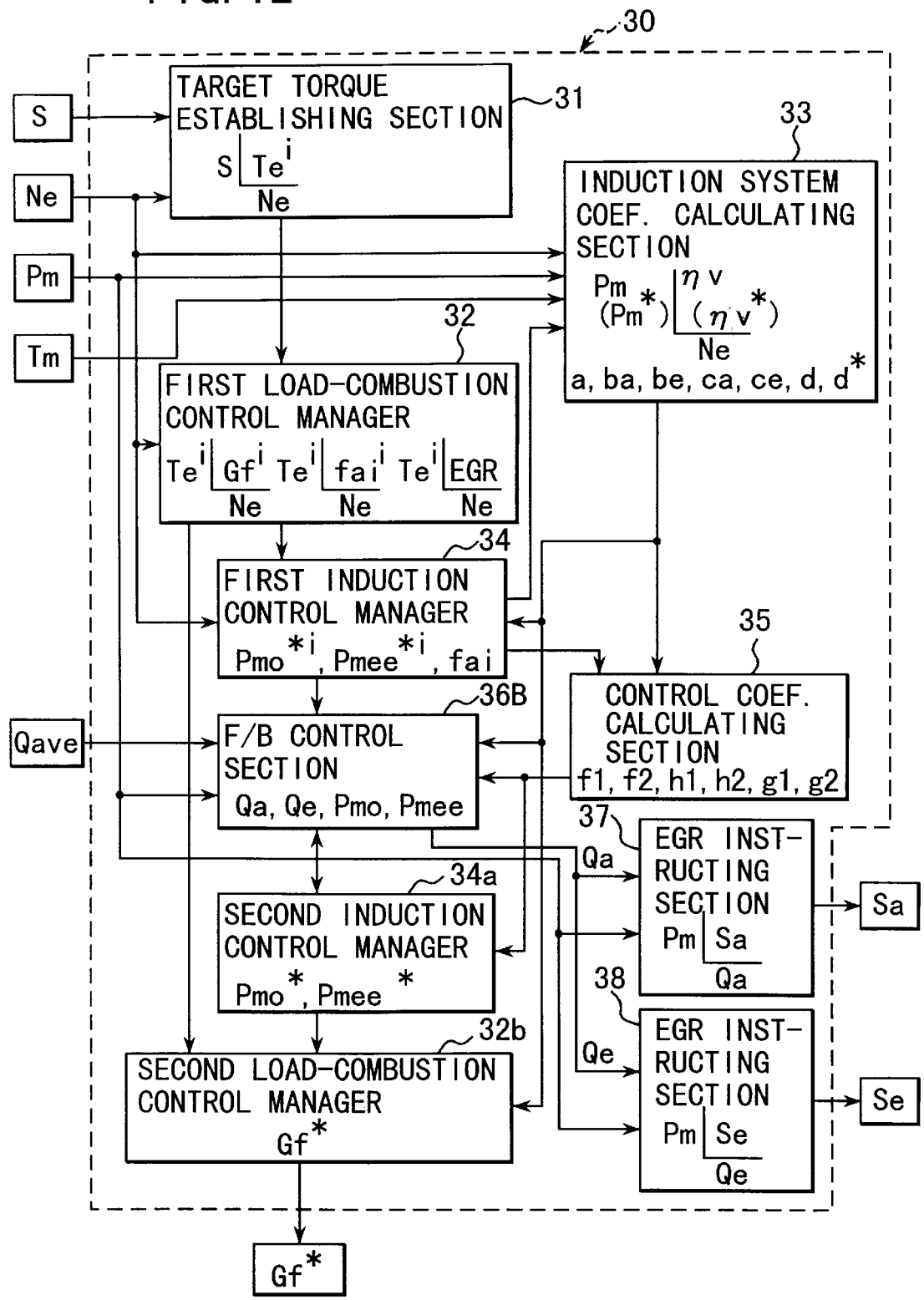
FIG. 12 is a block diagram of the fuel control, intake air control and EGR control according to the third embodiment of the present invention.
Figure 13:
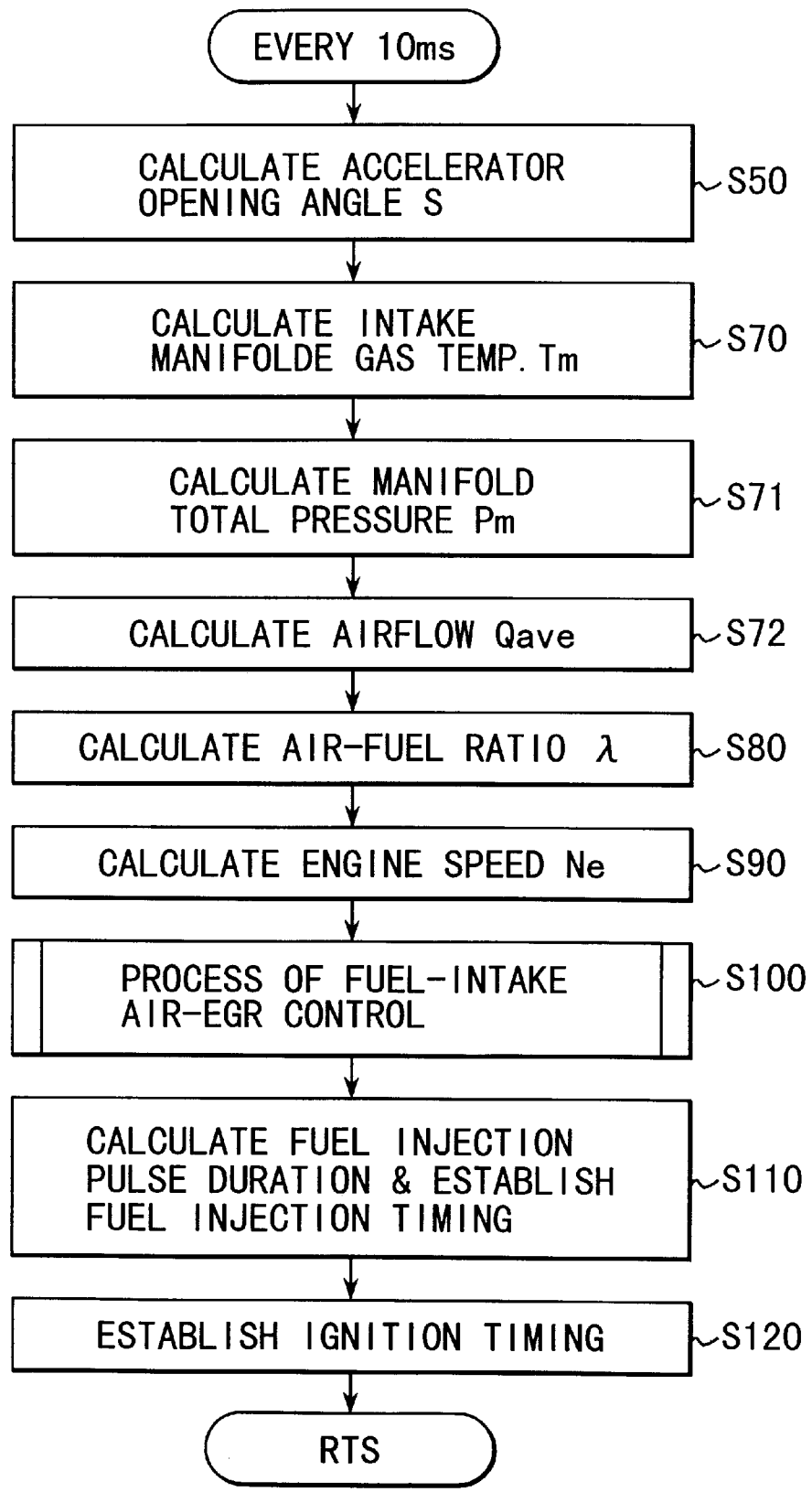
FIG. 13 is a flowchart illustrating a basic control routine executed periodically.

FIG. 11 through FIG. 13 relates to a third embodiment of the present invention. As shown in FIG. 11, compared to the first and second embodiments, a density sensor 9 is introduced for detecting a density of gas in the intake manifold in place of the intake manifold pressure sensor 5 and further an air flow sensor 8 is added for measuring the air flow passing through the throttle valve. In the main control unit 20, the manifold total pressure calculating section 26 in which the manifold total pressure Pm is calculated based on the output of the intake manifold pressure sensor 5 has been changed to a manifold total pressure calculating section 26A in which the manifold total pressure Pm is calculated based on the output of the density sensor 9 and an air flow calculating section 29 wherein the air flow measuring value Qave passing through the throttle valve is calculated based on the output of the air flow sensor 8 has been added.

As shown in FIG. 12, in the fuel-intake air-EGR control section 30, a F/B control section 36B employing the air flow measuring value Qave has been replaced with the F/B control section 36A of the second embodiment. It is needless to say that this F/B control section 36A may be replaced with the F/B control section 36 of the first embodiment.

Describing the difference between the flowcharts shown in FIG. 4 and FIG. 13, the step S60 where the manifold total pressure Pm is calculated based on the output of the intake manifold pressure sensor 5 has been deleted. Further, a step S71 where the manifold total pressure Pm is calculated based on the output of the density sensor 9 and a step S72 where the air flow measuring value Qave is calculated based on the output of the air flow sensor 8 have been inserted between the steps S70 and S80.

At S71, a manifold total pressure Pm is calculated according to the following equation (51):

$$Pm = \rho \cdot Ra \cdot Tm \quad (51)$$

where $\rho$ is a density of gas in the intake manifold, which is obtained by applying an A/D conversion to the output of the density sensor 9, Ra is a gas constant and Tm is a gas temperature within the intake manifold, which has been obtained at S70.

At S72, an air flow measuring value Qave is calculated based on the A/D converted output of the air flow sensor 8.

Further, in the processes of the F/B control section 36B according to this embodiment, when an air components partial pressure model value Pfo is calculated, as shown in the following equation (52), the air flow measuring value Qave obtained from the output of the air flow sensor 8 is employed in place of the air flow $Qa_{(-1)}$ preceding one control cycle in the equation (26):

$$Pfo = (1 - a \cdot dt) \cdot Pfo_{(-1)} + (b_a dt) \cdot Qave + (b_a \cdot dt) \cdot (1 - fai) \cdot Qe_{(-1)} \quad (52)$$

Other processes are carried out in the same manner as in the first and second embodiments. In this embodiment, since an actual air flow passing through the throttle valve is used for the feed-back control, the control accuracy is further improved.

In summary, according to the present invention, since the induction control and the EGR control are made while the air components and non-air components are assumed respectively with respect to the fuel injection amount corresponding to the target engine torque, miscellaneous delays in the induction and EGR systems can be compensated and the flow deviation of the air passing through the throttle valve can be prevented. Namely, since the fuel injection control, induction control and EGR control are performed in an integrated manner, optimizations in the fuel injection control, air flow control and EGR flow control can be realized, thereby an excellent follow-up ability with respect to the accelerator operation, a good drive feel and an improvement in exhaust emissions are obtained.

While the presently preferred embodiments of the present invention have been shown and described, it is to be understood that these disclosures are for the purpose of illustration and that various changes and modifications may be made without departing from the scope of the invention as set forth in the appended claim.

What is claimed is:

1. A control system of an engine having a cylinder, an intake manifold, a fuel injector for injecting fuel into said cylinder, a throttle valve for controlling an intake air and an EGR valve for controlling an EGR gas, comprising:

engine speed calculating means for calculating an engine speed;

accelerator angle calculating means for calculating an accelerator opening angle;

control parameter establishing means for establishing target values of control parameters based on said engine speed and said accelerator opening angle;

initial set value establishing means for establishing initial set values of a basic fuel injection amount, an EGR rate and an in-cylinder equivalent ratio, respectively, based on said target values;

equivalent ratio assuming means for assuming an EGR gas equivalent ratio from said initial set value of said in-cylinder equivalent ratio;

control target value establishing means for establishing a first control target value with respect to an air components partial pressure of intake manifold pressure and a second control target value with respect to a non-air components partial pressure of intake manifold pressure, respectively, based on said set value of said in-cylinder equivalent ratio, said initial set value of said basic fuel injection amount and said initial set value of said EGR rate;

non-air components partial pressure assuming means for assuming said non-air components partial pressure based on an air flow passing through said throttle valve and air components and non-air components of said EGR gas;

EGR gas flow establishing means for establishing an EGR gas flow based on a difference between thus assumed non-air components partial pressure and said second control target value of said non-air components partial pressure;

air components partial pressure assuming means for assuming said air components partial pressure based on said air flow passing through said throttle valve and air components of and non-air components of said EGR gas;

air flow establishing means for establishing an air flow passing through said throttle valve based on a difference between thus assumed air components partial pressure and said first control target value of said air components partial pressure and based on said air components of said EGR gas;

an EGR actuator for actuating said EGR valve so as to control said EGR gas;

EGR actuator means for calculating an operating amount of said EGR actuator based on said established value of said EGR gas flow and said intake manifold pressure and for actuating said EGR valve according to said operating amount of said EGR actuator;

a throttle actuator for actuating said throttle valve so as to control said intake air;

throttle actuator means for calculating an operating amount of said throttle actuator based on said established value of said air flow passing through said throttle valve and said intake manifold pressure and for actuating said throttle valve according to said operating amount of said throttle actuator; and fuel injection amount establishing means for calculating an operating amount of said fuel injector and establishing a final basic fuel injection amount.

2. The control system according to claim 1, wherein said EGR gas equivalent ratio is assumed based on an output of an air-fuel ratio sensor.

3. The control system according to claim 1, wherein said EGR gas equivalent ratio is assumed from a first order lag of said initial set value of said in-cylinder equivalent ratio.

4. The control system according to claim 1, wherein said EGR gas equivalent ratio is assumed from a first order lag of said initial set value of said in-cylinder equivalent ratio and a dead time established by intake manifold pressure and engine speed.

5. The control system according to claim 1, wherein said air flow passing through said throttle valve is measured by an air flow sensor.

6. The control system according to claim 1, wherein when said EGR gas flow is established, a time integral value of an error between a pressure response estimated value of said non-air components partial pressure and said assumed non-air components partial pressure is added.

7. The control system according to claim 1, wherein when said air flow passing through said throttle valve is established, a time integral value of an error between a pressure response estimated value of said air components partial pressure and said assumed air components partial pressure is added.

8. The control system according to claim 1, wherein said EGR gas flow is established so as not to exceed a predetermined maximum EGR gas flow.

9. The control system according to claim 8, wherein said predetermined maximum EGR gas flow is established in accordance with engine operating conditions.

10. The control system according to claim 8, wherein said predetermined maximum EGR gas flow is a value which is controllable within one control cycle.

11. The control system according to claim 1, wherein said air gas flow passing through said throttle valve is established so as not to exceed a predetermined maximum air flow.

12. The control system according to claim 11, wherein said predetermined maximum air flow is established in accordance with engine operating conditions.

13. The control system according to claim 12, wherein said predetermined maximum air flow is a value which is controllable within one control cycle.

14. The control system according to claim 1, wherein said final basic fuel injection amount is equal to said initial set value of said basic fuel injection amount.

15. The control system according to claim 1, wherein said final basic fuel injection amount is established based on said assumed air components partial pressure.

16. The control system according to claim 1, wherein said final basic fuel injection amount is established based on a pressure response estimated value of said air components partial pressure.

17. A control method of an engine having a cylinder, an intake manifold, a fuel injector for injecting fuel into said cylinder, a throttle valve for controlling an intake air, an EGR valve for controlling an EGR gas, a throttle actuator for actuating said throttle and an EGR actuator for actuating said EGR valve, comprising the steps of:

calculating an engine speed;

calculating an accelerator opening angle;

establishing target values of control parameters based on said engine speed and said accelerator opening angle;

establishing initial set values of a basic fuel injection amount, an EGR rate and an in-cylinder equivalent ratio, respectively, based on said target values;

assuming an EGR gas equivalent ratio from said initial set value of said in-cylinder equivalent ratio;

establishing a first control target value with respect to an air components partial pressure of intake manifold pressure and a second control target value with respect to non-air components partial pressure of intake manifold pressure, respectively, based on said in-cylinder equivalent ratio initial set value, said initial set values of said basic fuel injection amount and said EGR rate;

assuming said non-air components partial pressure based on an air flow passing through said throttle valve and air components of said EGR gas and non-air components thereof;

establishing an EGR gas flow based on a difference between thus assumed non-air components partial pressure and said second control target value of said non-air components partial pressure;

assuming said air components partial pressure based on said air flow passing through said throttle valve and air components of said EGR gas and non-air components thereof;

establishing an air flow passing through said throttle valve based on a difference between thus assumed air components partial pressure and said first control target value of said air components partial pressure and on said air components of said EGR gas;

calculating an operating amount of said EGR actuator based on said established value of said EGR gas flow and said intake manifold pressure and actuating said EGR valve according to said operating amount of said EGR actuator;

calculating an operating amount of said throttle actuator based on said established value of said air flow passing through said throttle valve and said intake manifold pressure and actuating said throttle valve according to said operating amount of said throttle actuator; and calculating an operating amount of said fuel injector and establishing a final basic fuel injection amount.

* * * * *